United States Patent [19]

Ernest

[11] 4,109,617

[45] Aug. 29, 1978

[54] CONTROLLED FLOW COOLING SYSTEM FOR LOW WEIGHT RECIPROCATING ENGINE

[75] Inventor: Robert P. Ernest, Dearborn Heights, Mich.

[73] Assignee: Ford Motor Company, Dearborn, Mich.

[21] Appl. No.: 753,343

[22] Filed: Dec. 22, 1976

[51] Int. Cl.² ............................................. F01P 3/02
[52] U.S. Cl. .............................. 123/41.74; 123/41.75; 123/41.82 R
[58] Field of Search ............... 123/41.74, 41.75, 41.77, 123/41.82 R, 41.82 A

[56] References Cited

U.S. PATENT DOCUMENTS

| 2,941,521 | 6/1960 | Rarey et al. | 123/41.82 R |
| 3,203,408 | 8/1965 | Winkelman | 123/41.74 |
| 3,385,273 | 5/1968 | Baster | 123/41.82 R X |

Primary Examiner—Robert G. Nilson
Attorney, Agent, or Firm—Joseph W. Malleck; Olin B. Johnson

[57] ABSTRACT

A light metal die-cast head and cast iron block employ a low volume cooling system which cooperates with the differing thermal conductivity properties of said head and block. The cooling concept eliminates the conventional intricate water jacket and replaces it with continuous grooves which wrap hemi-cylindrically about each combustion cylinder in a thinly spaced relation. The grooves are exposed along their length at the deck surface of either the head or block. The total fluid mass in the system is reduced to as little as 1/5. There are two such grooves in the block which (a) extend from one end thereof to the opposite end, (b) are on opposed sides of the cylinder galleys and (c) have substantially no transverse flow in order to promote laminar or controlled flow. There is a critically located straight drilled passage along with two such grooves in the head, the combination of which is restricted in throat area when compared to the throat area of the grooves in the block; this results in a high velocity flow in the head and a low velocity flow in the block when they are connected in series flow relation. The straight longitudinally drilled passage (which may include one or more of such passages) is located in the head separating the exhaust and metal valve guides; the passage has a throat area equal to or less than the throat area of either of the grooves in the head. Heat extraction is more easily and flexibly programmed to achieve not only a more uniform wall temperature throughout the head and block, but permit a desirably slightly higher average wall temperature than conventional light metal heads for improvement in fuel economy and thermal efficiency.

35 Claims, 23 Drawing Figures

CONTROLLED FLOW COOLING SYSTEM FOR LOW WEIGHT RECIPROCATING ENGINE

BACKGROUND OF THE INVENTION

It is desirable to operate the engine at temperatures as close to the limits imposed by oil properties and strength of the materials as possible. Removing too much heat through the cylinder walls and head lowers engine thermal efficiency. However, prior art cooling systems have tended to overcool in some zones and undercool in others; the prior art systems have been a rough compromise designed to remove approximately 30 to 35% of the heat produced in the combustion chambers resulting from the combustion of an air-fuel mixture. The systems have typically been of the forced circulation type utilizing a water jacket placed around the engine cylinders. Through the years, the water jacket has evolved as an immensely intricate casting with intersecting channels and intersecting bosses delicately cored within the metal casing. Principal emphasis has been to allow water to circulate freely within a bath adjacent the cylinders and head valves. On some engines, water distributing tubes or nozzles have been used to direct the flow of the cooling water into the water jacket reservoir in the hopes of regulating heat transfer. Because of the need to extend bolts, shafts and shanks through the water jacket cavity, flow therein is interrupted and detrimentally affected. The water jacket has now become a labyrinth of passages which do not contribute to controlled fluid flow.

The need to improve the cooling system, increase fuel economy, and economize on the use of cast material has only recently become acute. Prior to this there was greater emphasis given to ease of casting and the benefit of having a large safety factor in block strength by making the engine block large and relatively heavy. Now there is a clear necessity to reduce the weight of the engine, utilize less casting material, while at the same time increase the efficiency of the cooling system.

To economize on weight as well as improve thermal efficiency, several problems must be simultaneously overcome, including: (a) elimination of turbulent cooling flow within the engine block resulting from improper passage wall design; (b) design and cast thinner wall sections throughout the engine, which sections are more closely designed to the material strength limit thereby eliminating excess weight; (c) substitute lighter materials having a higher thermal conductivity without sacrificing strength; and (d) reduce the volume and thereby the weight of cooling fluid while still maintaining a uniform engine wall temperature. These problems of flow, thickness, material and fluid volume must be overcome together.

SUMMARY OF THE INVENTION

A primary object of this invention is to provide a new cooling system for an internal combustion engine which extracts heat energy more closely programmed to that which is best adapted for maintaining the metal temperature of the engine housing at a desirable level within design limits and at a more uniform operating temperature throughout while at the same time allowing for a significant reduction in weight of the engine.

A further object, in conformity with the above, is to provide a unique cooling system which increases engine fuel economy, increases horsepower for an equivalent sized engine, and enables the engine to use a leaner combustible mixture while meeting stringent emission standards.

Still another object of this invention is to permit engine design to be more flexible providing for design tradeoffs between the hot strength of the materials utilized, the hot wear resistance capability of the materials employed, and cost factors, to obtain the best combination thereof.

Yet still another object of this invention is to provide a novel head and block construction for an internal combustion engine housing characterized by a cooling system (a) arranged to convey fluid in a singular series relationship between the fluid flowing in the block and that flowing in the head; (b) the flow is arranged to move in consecutive series relationship from cylinder to cylinder within the block or within the head, (c) the flow is programmed to have a relatively low velocity in conjunction with a material having a lower thermal conductivity and low heat rejection, such as in the block, and a higher velocity in the head which is comprised of a material having a much higher thermal conductivity and higher heat rejection (the result being that the highest heat concentration zones will be reduced in temperature more effectively to provide a better overall uniform wall temperature for the engine housing).

Specific features pursuant to the above objects comprise: (a) use only a pair of thin bands of fluid to cool the block and use only three narrow laminar flow paths of fluid to cool the head, one of the latter being a critically placed cylindrical boring passage disposed between the exhaust gas passages and valve guide cylinders; (b) casting the head and block each with a mating deck surface having open grooves extending from said deck thereinto to define a passage for a continuous band of laminar or controlled flow extending successively along one side of each of the engine cylinders; by use of a specially designed block to head gasket, the flow will be directed to pass substantially throughout the entire transverse length of the engine block before being permitted to pass transversely through the head; (c) the gasket separating the deck surfaces of said head and block have a slot at one end to act as an ingate for flow to the head; (d) small apertures are defined in the gasket to short circuit or shunt a small pencil-sized flow of fluid to the head at the innermost undulations of the band of water so as to act as vortex shedder at each such location; (e) controlling the size of the slot in said gasket and head grooves to insure a velocity flow ratio between said head and block of at least 5:1 with the fluid flow through said head being typically in the velocity range of about 120–130 inches per second; (f) the cooling fluid passages, particularly those in the block, provide controlled flow producing a higher coefficient of heat transfer and less energy loss; (g) the system reduces or holds back pressure equivalent to back pressures of current systems while providing said other advantages; (h) the volume of coolant flowing through said system is reduced to 1/5 that of current systems; and (i) walls separating the cooling channel and a combustion cylinder have a thinner section and are more uniform in dimension thereby providing more controlled heat transfer in those areas requiring increased cooling and in those areas requiring decreased cooling.

DETAILED DESCRIPTION

One of the principal features of this invention is the use of an engine housing water jacket which is significantly decreased in volume and yet is arranged to provide improved cooling over that of conventional engines. This is brought about in part by a series flow concept, and in part by using different flow velocities in different portions thereof, including a critically placed cylindrical boring to carry fast laminar cooling flow between the exhaust gas passages and the valve guide cylinders. For the series flow concept, the fluid is allowed to enter the engine block at one end, separate into two wide bands of fluid which move parallel to each other and along opposite contours of the cylinder gallery without merging except at the opposite end; at such end the paths are permitted to merge and turn upwardly into the engine head where the flow again proceeds to separate into two, three or four channels which move back transversely across the head, two of which are located similarly but oppositely to that in the block. Fluid in said bands is design to move in a laminar or controlled flow manner, the bands being so thin that they appear as convoluted sheets of fluid. The fluid bands are differential in size so as to provide a relatively low fluid flow velocity in the block from a given pump source and a higher fluid velocity in the head. When the series flow concept and differential velocity system is combined with a system of using high thermally conductive material about the high velocity flow and a lower thermal conductivity material about the relatively lower velocity flow, the new total cooling system herein emerges and obtains optimization of energy useage.

Figure 1:
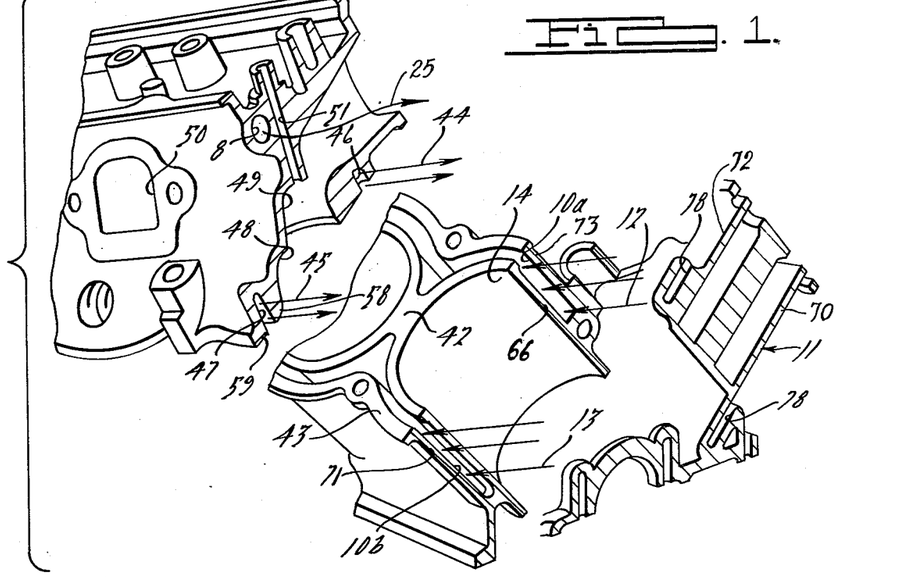
FIG. 1 is an exploded perspective view of part of the engine housing of FIG. 6; the housing being broken away along a sectional plane.
Figure 2:
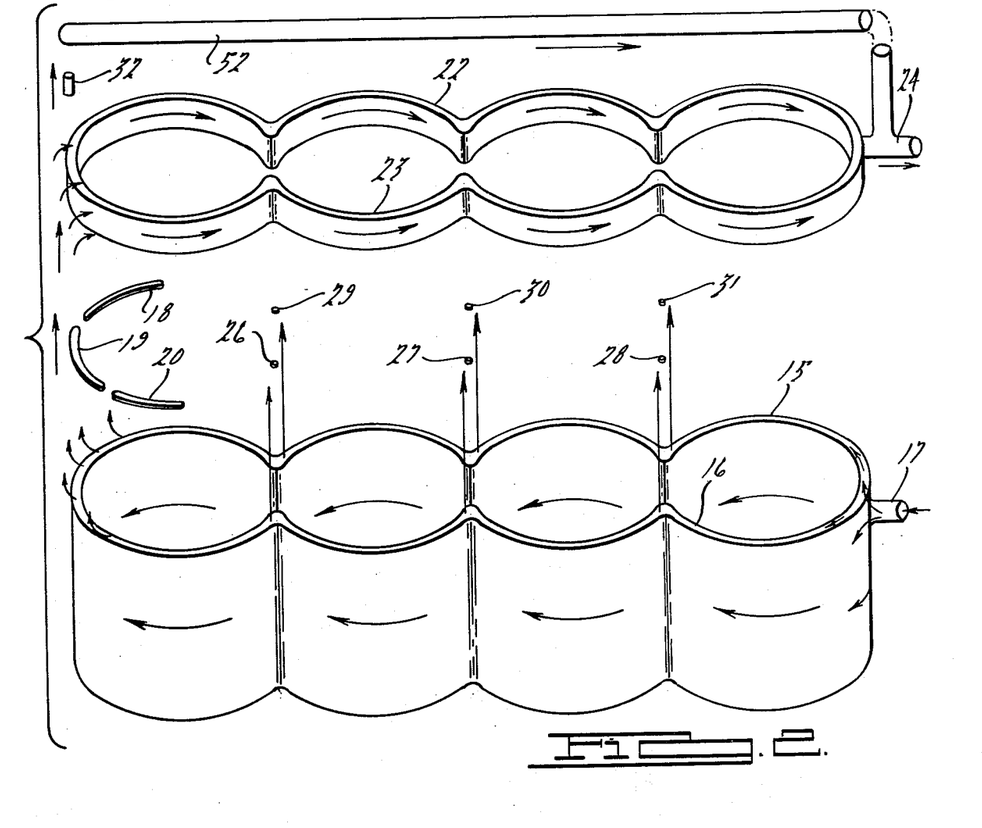
FIG. 2 is a schematic composite view of the bodies of cooling fluid, detached from the engine of FIG. 6, showing the fluid paths and flow character for this system of this invention.
Figure 3:
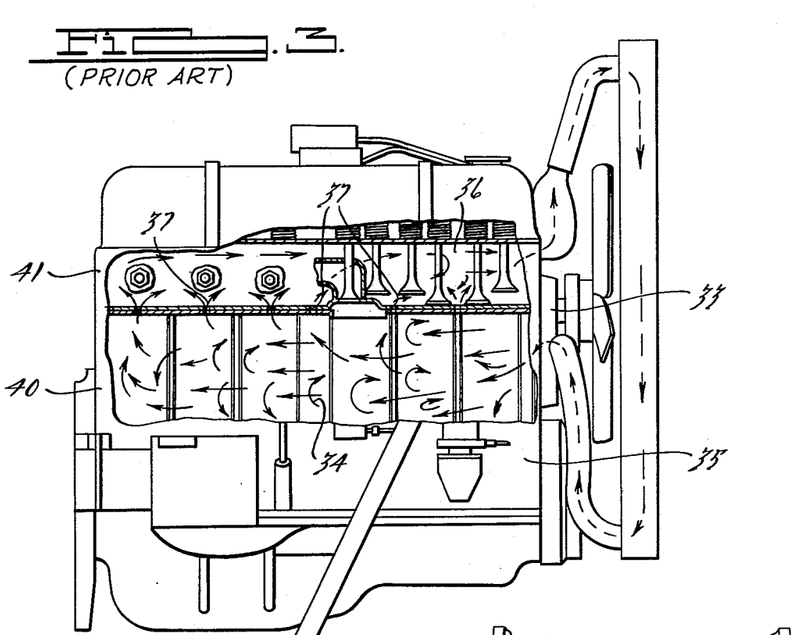
FIG. 3 is a schematic elevational view, partly broken away, of an internal combustion engine depicting a conventional cooling system in accordance with the prior art.
Figure 4:
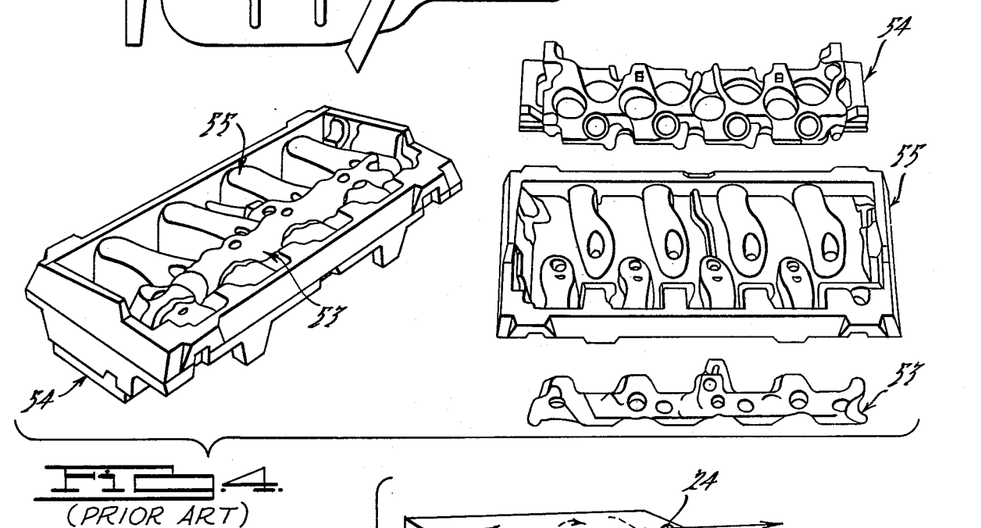
FIG. 4 is a composite view of several separated core clusters used to define passages in a prior art head and of their nested or stacked position.
Figure 5:
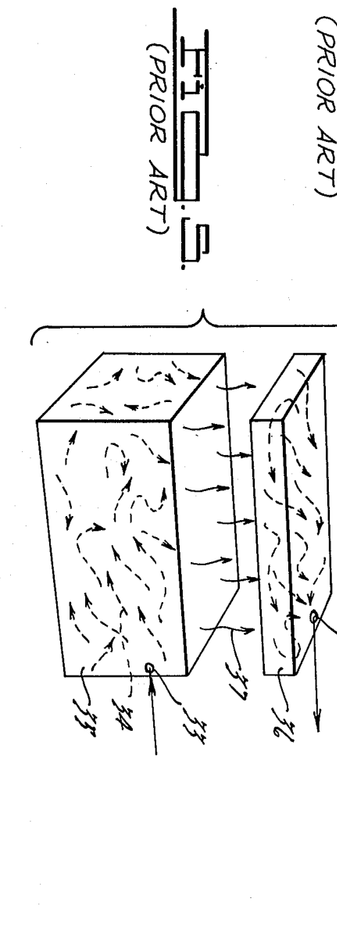
FIG. 5 schematically illustrates the body of cooling fluid, detached from the engine of FIG. 3, with flow lines disclosing the character of flow.

The series flow concept can best be appreciated by comparing the schematic illustration in FIG. 2 (representing the invention) and the schematic illustration in FIG. 5 (representing prior art), and also comparing the structure of FIG. 1 with that of FIGS. 3 and 4.

Figure 7:
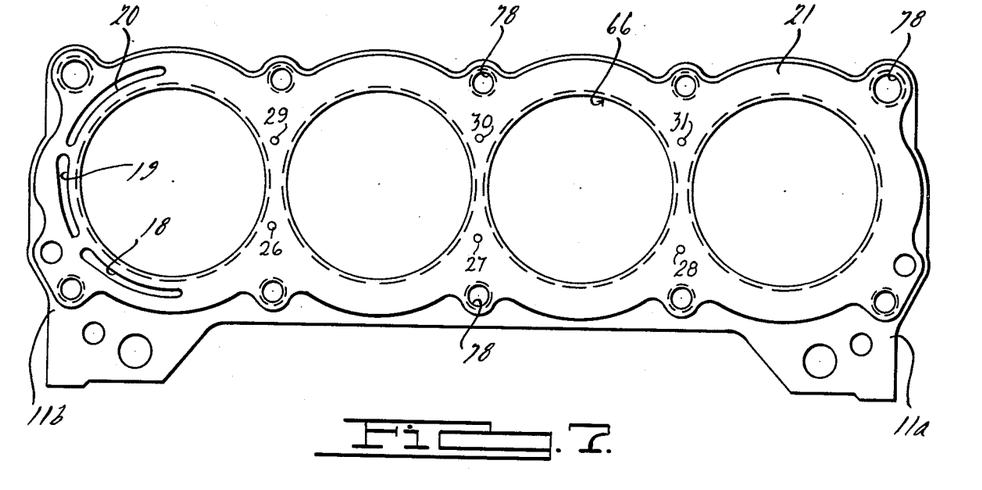
FIG. 7 is a view looking directly down upon one galley of cylinders of the head illustrated in FIG. 7 together with the sealing gasket superimposed thereon.
Figure 8:
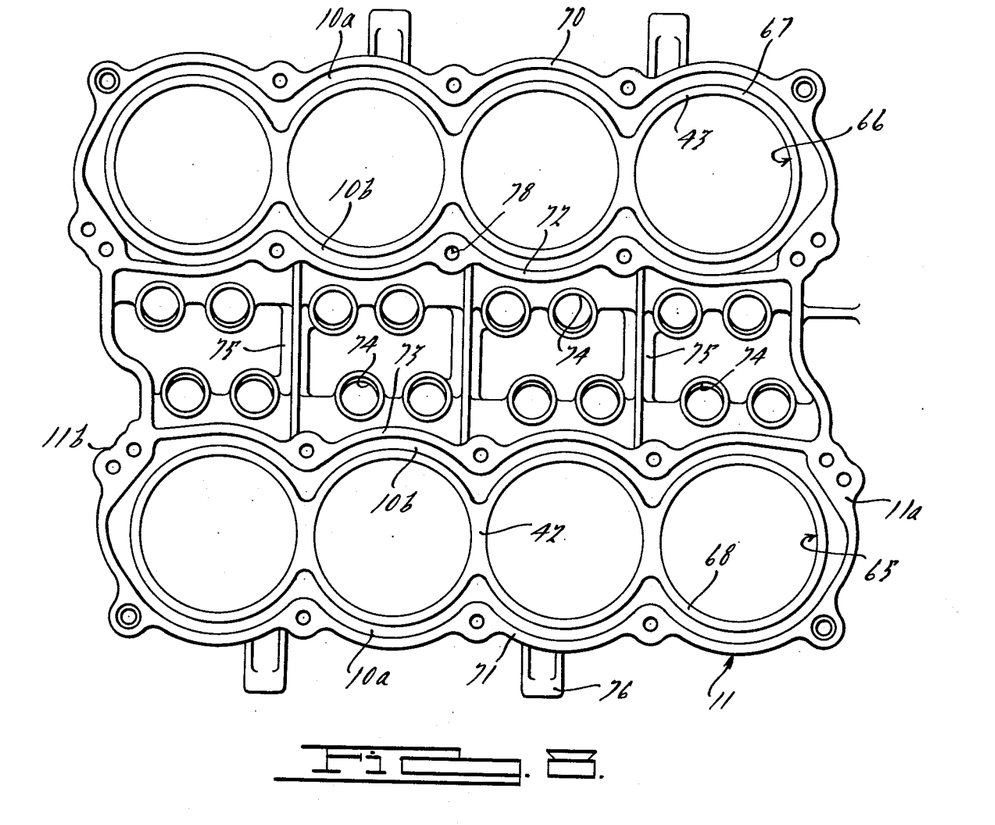
FIG. 8 is a plan view looking directly down upon the galleys of cylinders in the engine block.
Figures 9, 10:
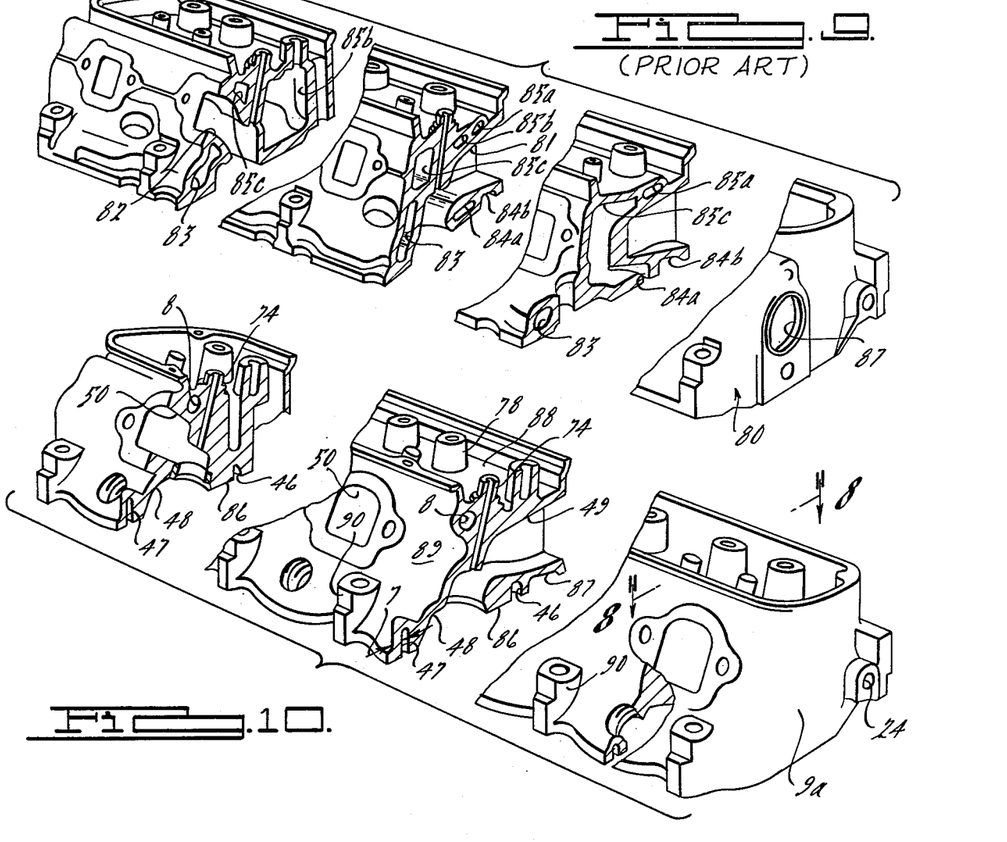
FIG. 9 is an exploded perspective of various sectioned portions of an engine head constructed in accordance with the prior art.
FIG. 10 is a view similar to FIG. 7 but depicting a head constructed according to this invention.
Figure 11:
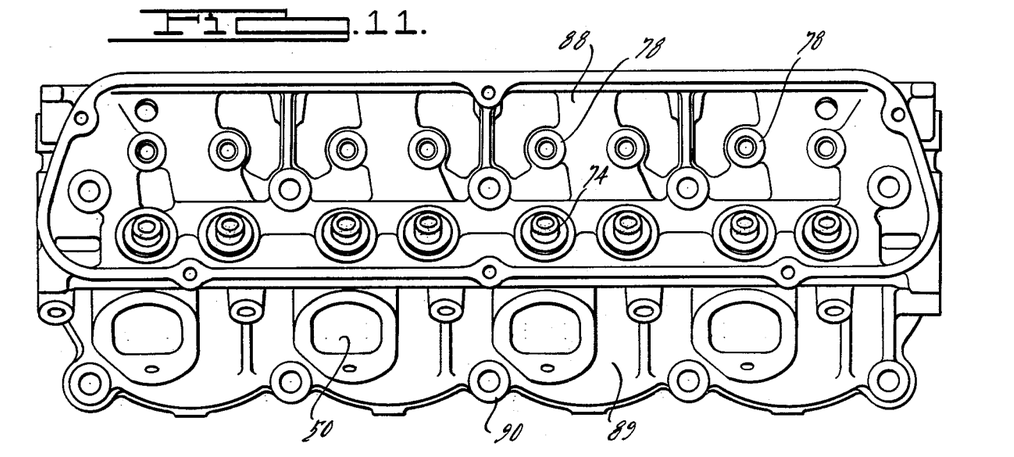
FIG. 11 is a top view of the engine head of FIG. 7 and taken in the direction of the arrows shown in FIG. 7.

Grooves or passages 10a and 10b are defined in the block 11 to provide primarily two fluid paths 12 and 13 (indicated by arrows in FIG. 1 for each cylinder galley) which begin at one end of the block and are supplied through an inlet 17 from a conventional engine pump (not shown). The fluid flows in said grooves consecutively along each series or galley of in-line cylinders 14, the paths being so defined that the body of cooling fluid, if separated from the engine would appear as wide bands 15 and 16 of fluid which move in a laminar or controlled flow manner toward the remote or opposite end of the block. The bands are thin and adapted to conform to the undulating contour of one hemi-cylindrical side of each of said cylinders in the galley. Upon reaching the opposite end, the fluid paths merge and the fluid is directed upwardly through arcuately aligned slots 18, 19 and 20 in a gasket 21 (see FIG. 7) separating the block 11 and head 9, such slots being dimensioned to place an ingate effect upon said fluid flow stimulating an increase in velocity for the head. Fluid flow passes through the slots and again divides into three paths 44–45 and 52 providing two fluid bands 22–23 and one fluid cylinder 52, all shorter in height and or smaller in area than the bands in the block. The bands 22–23 proceed back along the undulating contours of the cylinder galley to the end 9a (see FIG. 10) where they are permitted to return to the radiating system through outlet 24. In the head 9, the third path 25 provides a most important function; the path is defined by a central boring 8 located at the top of the head and spaced above and midway between the two fluid bands 22–23 and is adjacent to the engine valve guide cylinders 51. The boring defines the fluid cylinder 52 which is fed by a column 32 of fluid. In addition, small volumes 26-27-28-29-30-31 of fluid are permitted to be sequestered from the first two fluid bands 15 and 16 before reaching the end 11b of the block (see FIG. 7) thereof in minute quantity and only for purposes of acting as vortex shedders at the inner contours of the upper two bands 22–23. These small volumes do not form a part of the normal cooling flow, but rather are hydrodynamic flow guides.

The block 11 is made from a casting having grooves extending from the casting parting surface 43 downwardly along each of the cylinder walls 14, the cylinder walls being defined as rather thin sectioned walls (about 0.15 inches thick) which stand free except for a solid connection 42 (about 0.3 inches thick) between each of the cylinders in a siamese fashion. The walls surrounding the cooling grooves are exposed to ambient temperature conditions and are about 0.12 inches thick. The two paths of fluid 12 and 13 through the block undulate around the hemi-cylindrical shaped groovings 10a and 10b. In the head, paths 44 and 45 are formed by groovings 46 and 47 extending upwardly substantially the same height as the roof wall 48 or closure for each cylinder. The third path 25 defining a straight cylinder of fluid 52 extends substantially along the area of the casting which is above the intake and exhaust passages 49-50 and between the exhaust gap passages 50 and the valve guide cylinders 51.

Such series flow concept is dramatically different than that which is now experienced within conventional engine cooling jackets (turn to FIGS. 3-5). Here, fluid is permitted to enter the block casting at one station 33 and because of the design of the passages of the water jacket, fluid is permitted to tumble and turbulate within the fluid body 35 of block 40, such as at 34, to result in a turbulant bath with no specific requirement that the fluid pass along a streamline flow to the opposite end of the housing before being permitted to move upwardly into the body of fluid 36 in the head 9. In fact, openings throughout the entire gasket 21 separating the head 9 and block 11, permit fluid to be short circuited in large quantities at several points, such as at 37, insuring that substantially all of the fluid will not move from one end 11a of the block to the other end 11b before entering the head 9 or exiting at 24. Thus, fluid flow can be considered, in FIGS. 3 and 5, to be the opposite of series flow. Over 90% of the fluid traverses the full length of each of the block and head for the present invention, whereas in the prior, only up to 65% of the fluid may do so. The rather wide bulky passages in the block and head 9 are incorporated more for convenience of casting than for control of fluid flow. Such passages are best illustrated, for example, by viewing the sand core clusters 54 and 53 used to define the cooling passages in the head (see FIG. 4). These components are nested with the core cluster 55 used to define the intake and exhaust passages (as shown at the right).

In prior art constructions, there is no intention or desire to create only a thin sheet of fluid which is directed along the walls of the cylinders. To the contrary, a flooding concept is employed where as much fluid as possible is placed as a bath adjacent the cylinders without specific regard to the volume of fluid or the character of the flow induced as a result of the unavoidable interruptions of such fluid bath. In some prior art constructions, the bath approach is modified to achieve a thermal siphon action, but the latter lacks adequate response to the variable cooling needs. As a result, heat is extracted at a rate which is non-uniform and difficult to assess; usually the rate results in undercooling at some portions of the cylinder walls and overcooling at other portions; a non-uniform wall temperature is created which prevents attainment of the goals of this invention.

METHOD

Figure 6:
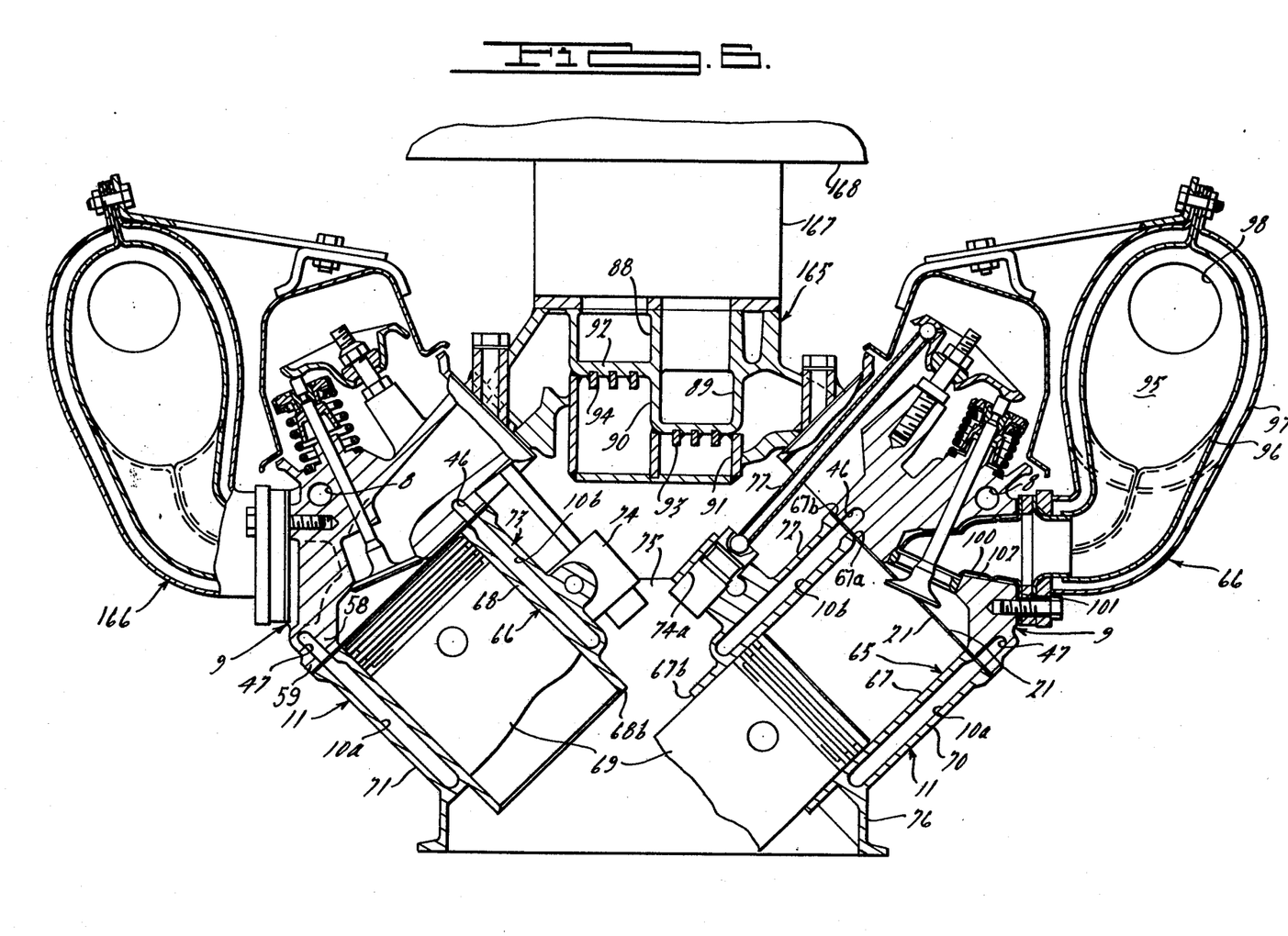
FIG. 6 is a partial sectional elevational view of an internal combustion engine embodying the invention herein.

A preferred method of cooling an internal combustion engine according to the invention would comprise at least two essential aspects: (a) providing a housing with first walls (such as 66-71) and second walls (such as 58-59) together defining a series of cylinders for carrying out combustion, the second walls surrounding that portion of the cylinders within which ignition of a combustible mixture takes place and said first walls providing for expansion of said combusted mixture, said second walls being comprised of a material having a higher thermal conductivity than said first walls by a factor of at least 1.5, and (b) conveying cooling fluid through at least one continuous passage (such as 10a-10b in the block and 46-47-8 in the head) extending through and between both said first and second walls, said passage having a smaller throat area for the flow in said second walls than in said first walls to establish a higher velocity fluid flow through said second walls than through said first walls (compare visually cross-sectional area of grooves 10-46-47 and hole 8 shown in FIG. 6). The passages should extend in a manner to carry fluid consecutively along each of the cylinders in the first walls before extending in series into the second walls where again the passages split and extend consecutively along each of the cylinder portions and each of the valve guides in the second walls. The flow velocity of fluid flow in the second walls should be higher than the flow velocity in the first walls by a ratio of about 5:1. The weight of the fluid system in a 5 liter engine when incorporating such cooling method, can be about 8 lbs.; this is significantly low when compared to 17.9 lbs., the weight of fluid required in a conventional engine for an equivalent application. This is a net weight saving in fluid of 9.9 lbs.

Figure 13:
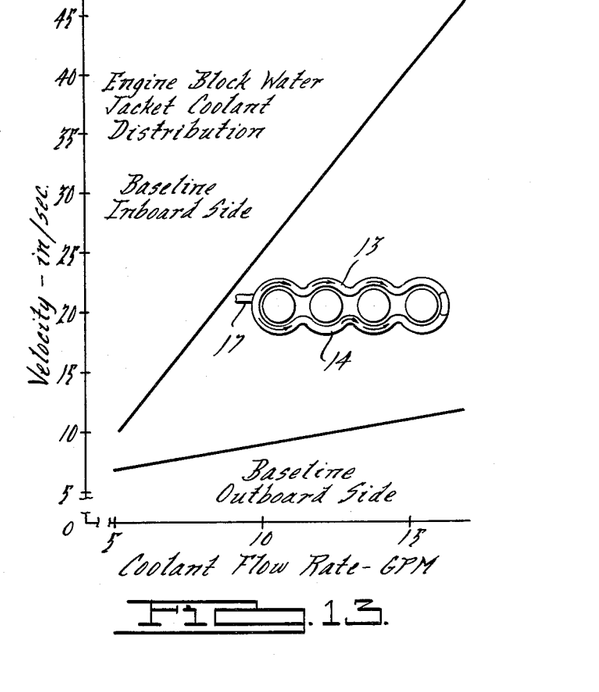

The placement of the inlet 17 will influence the velocity distribution between the inboard flow 12 and the outboard flow 13 in the block. For example, if the inlet 17 is located as in the schematic inset for FIG. 13, then the velocity distribution in the block will be as plotted in the graph for FIG. 13. Depending on whether there is a need for greater or less cooling on one side or the other, the inlet can be relocated to render coolant velocity tailored to such needs or establish equal velocities in both passages.

Figure 12:
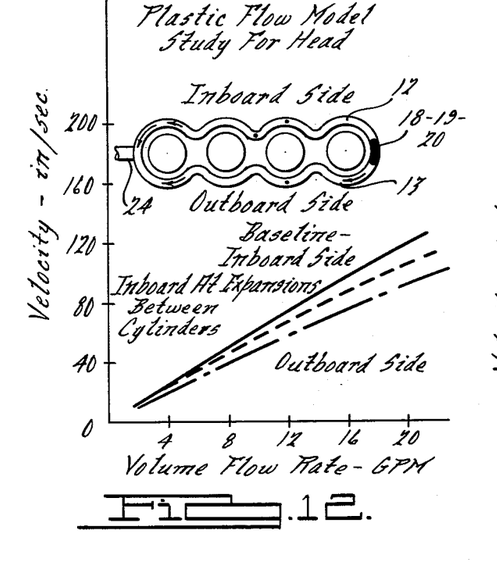
FIGS. 12-15 are graphical illustrations of various physical parameters of the cooling system for the embodiment of FIG. 1.
Figure 14:
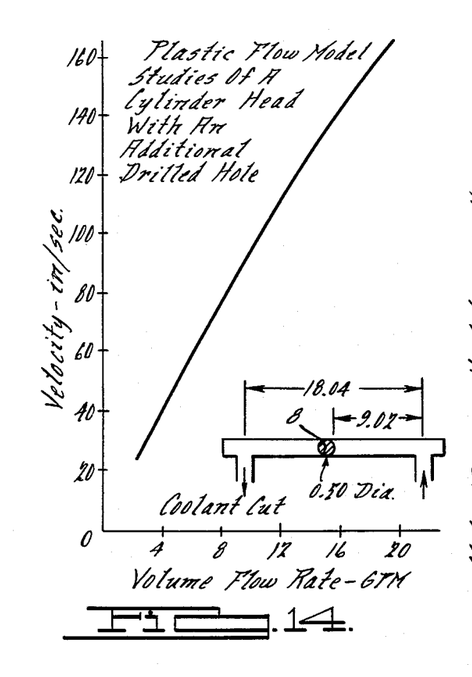

Since the effective inlet to the head is slots 18-19-20 at one end of the head gasket and since the slots direct flow upwardly therethrough, the velocity distribution will substantially be similar to that in the block and as shown in FIG. 12, but of much higher value due to throat area. Moreover, the drilled passage 8 in the head will exhibit an even greater increase in its velocity pattern with the same flow in the head, indicated in FIG. 14; the passage 8 must do a superior cooling job in a remote region of the head and does so in conjunction with the right metal material. For example, the throat area of passage 8 is about 0.55 in.$^2$, and the throat area of passage 46 or 47 is about 0.6 in$^2$. The total throat area of the head passages is about 1.70 in.$^2$ compared to 8.5 in.$^2$ for the block. This will typically result in flow velocities of 120-130 inches/sec. in the head and about 20 inches/sec. in the block, assuming the liquid coolant has a viscosity of about 0.81 centipose at 190° F.

Figure 15:
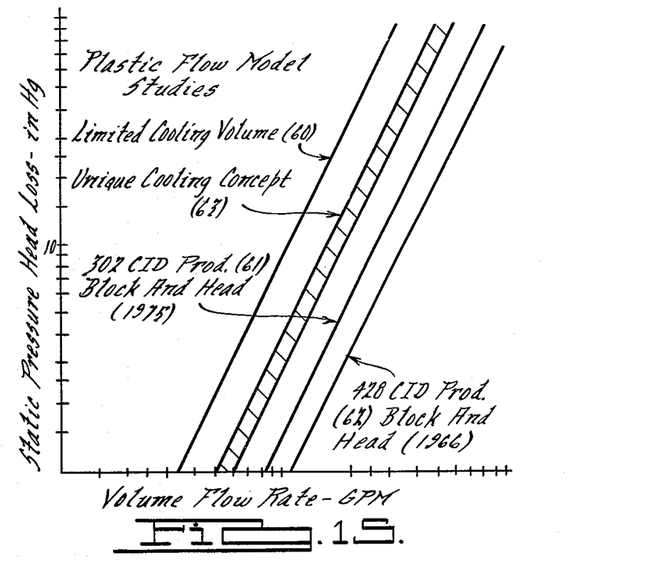

Turning now to FIG. 15, the pressure head loss resulting from using this method of increasing flow velocity in the head (see plot 63) is less than that experienced by merely limiting the cooling volume (see plot 60) when compared with a conventional 1975 302 CID production system (see plot 61) or a conventional 1966 428 CID production system (see plot 62).

The passages 46-47 and 8 in the head play a key role in controlling wall temperature. They are comparatively small, but flow velocity is high. This in conjunction with the high thermal conductivity of aluminum diffuses heat more uniformly. Passages 46 and 47 are joined by small bleeding flows at the inner undulation; this is necessary to drive away any formation of vapor at these locations generated by cavitation and to act as a compressor on the fluid above to retard boiling.

APPARATUS

Turning now to FIGS. 6-11, a preferred engine housing, incorporating the cooling system herein, comprises a V-type cast iron block 11, two aluminum alloy cylinder heads 9, an aluminum intake manifold 65, preferably a double-walled exhaust manifold 66, conventional 4-barrel carburetor 67 and air cleaner 68, and aluminum alloy pistons 69. The pistons 69, movable within the cylinders of the block, are preferably comprised of aluminum of conventional design having typical sealing rings. The cast iron block is preferably constructed by way of a sand cast method using the cavityless method of casting whereby a foam pattern is surrounded by unbonded sand. Deep grooves, defining the inboard and outboard water passages, as well as the cylinders, are by a common sand core cluster which is introduced from one side of the pattern. The resulting casting should have thin walls defining a first galley of cylinders 65 on one side of the block and a second galley 66 of cylinders on the other side, in a V-8 configuration. The cylinder walls 67 and 68 are open at both ends, one end (67a or 68a) terminating at the parting surface 43 and being exposed to the gasket 21 mounted thereon separating the block from the head. The other end (67b or 68b) is exposed to the crankcase chamber. Additional walls outboard walls 70 and 71, and inboard walls 72 or 73, define the cooling fluid channels or grooves 10a and 10b. Other wall portions 74-75-76 respectively define sleeves 74a for rocker arm actuator rods 77, webbing and walls for mounting the engine crankshaft, mounting feet for the block, and cylinders 78 for mounting tension bolts (not shown), and auxiliary equipment.

One feature of the cast iron block of this invention is the open deck access to all of the cooling passages therein; sand cluster corings may be employed in the casting pattern and are readily removable. It is desirable that the pattern for such block be formed of a material that is consumed and burned upon contact with molten metal, such as polystyrene. This should be carried out according to the technique of cavityless or evaporative casting procedures.

The head 9 is preferably comprised of aluminum material thereby rendering thermal conductivity in excess of 0.28 calory-centimeter per second-centimeter squared-° C., a minimum for purposes of this invention.

Prior art heads have been constructed of aluminum, but their configurations have considerably required or contained cooling passages which prevented controlled series flow. For example, in FIG. 9, a prior art head 80 is illustrated having non-straight intake and exhaust passages 81-82. Water passages were created wherever space would permit; this resulted in non-uniform and interrupted passages 83, 84 and 85, which in some cases provided excessive flooding of some head zones and in other cases provided inadequate cooling flow. The cooling passages are not of the open deck type, but rather are cored passages which do not have any regular or uniform cross-section. The passages 83, 84 and 85 occupy any available space in the solid walls adjacent the heat centers, such as the roof of the cylinder and exhaust passages. Very little, if any, of the cylinder roof is exposed to ambient air conditions for radiation, but rather is substantially enclosed by a water jacket. Each of the passages have intersecting portions; fluid passing through such varying passages will experience a non-laminar flow of considerable turbulence causing a deficient heat exchange relationship with the casting material.

The head of this invention (FIG. 10) eliminates such cooling disadvantages. It is preferably constructed by way of a semi-permanent mold die-casting technique again having an open deck by which one sand core cluster may be deployed to define the intake passages while three mating permanent dies define all other aspects of the head. More specifically, a bottom die is used to define the deck surface 86, grooves 46-47, cylinder roof walls 48 and other contours, such as 87, the lower portion of the head. The upper right die piece is used to define the various bolt cylinders 78 and rocker arm bosses or walls 74, and other upper surfaces 88. The upper left hand die piece is used to define the exhaust passages 50, sloping wall surface 89 and bolt bosses 90.

The grooves 10 extend substantially to the general height of the roof wall 48; the grooves are spaced apart on opposite sides of the cylinders and are spaced from the boring 8 by at least 3 inches. The grooves are adapted to closely conform to the periphery defined by the aligned hemi-cylindrical shapes at one side of each cylinder galley. In a sense, the location of the three fluid paths passages (44-45-25) form an equilateral triangle which, when incorporated with a high thermal conductivity material, provides more efficient heat extraction and maintenance, a more uniform and desirable wall temperature without the necessity for greater cooling fluid volume and greater weight of the solid mass.

Figure 16:
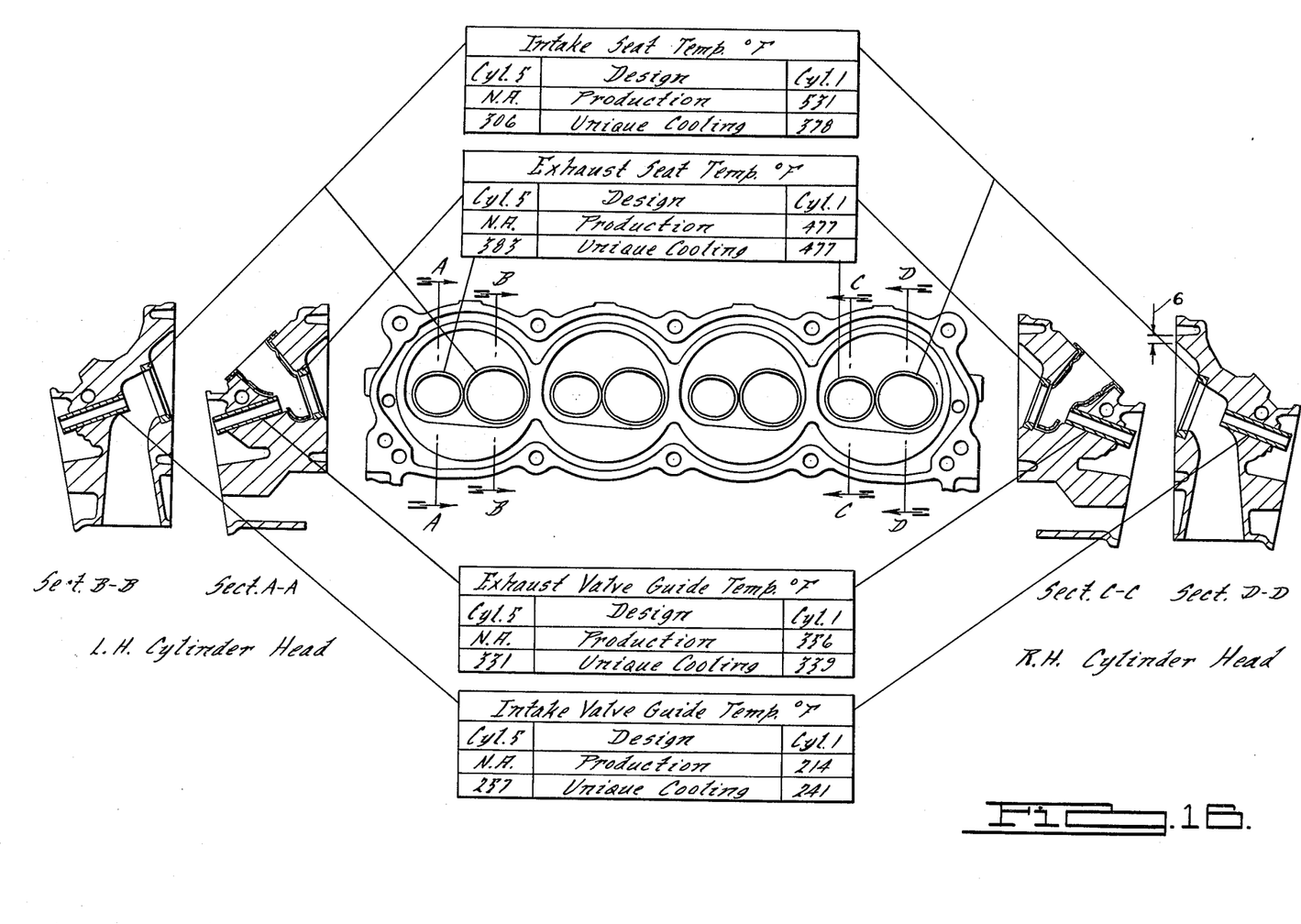
FIG. 16 is a composite diagram and chart depicting valve guide and seat temperature conditions in a head employing this invention and for a head employing conventional principles.
Figure 17:
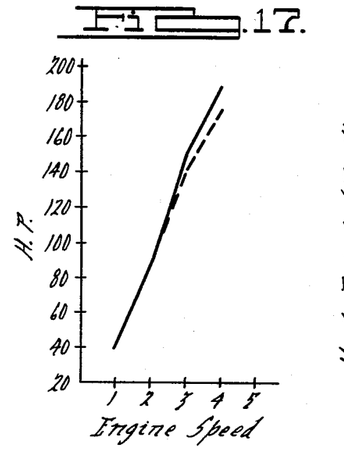
FIGS. 17-23 are graphical illustrations of various engine parameters plotted against engine speed for an engine according to this invention.
Figures 18, 19:
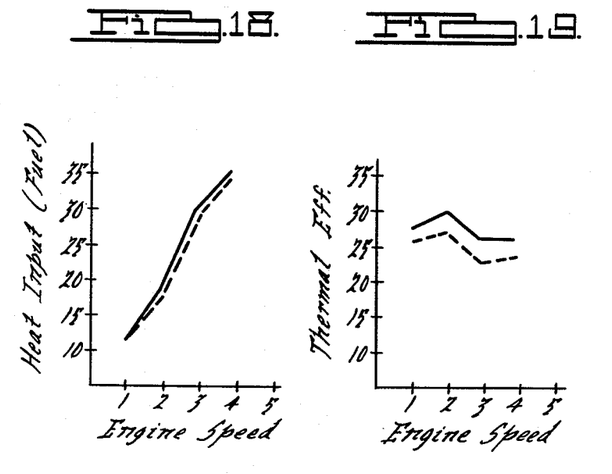
Figure 20:
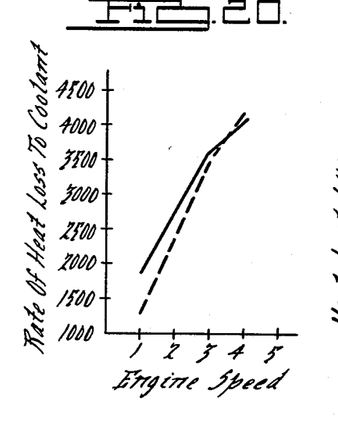
Figure 21:
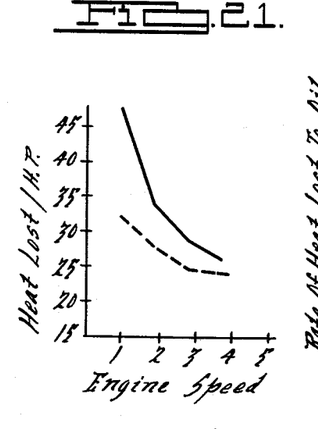
Figure 22:
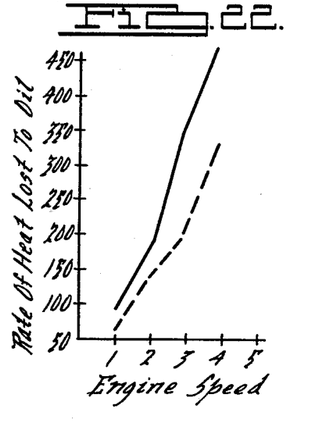
Figure 23:
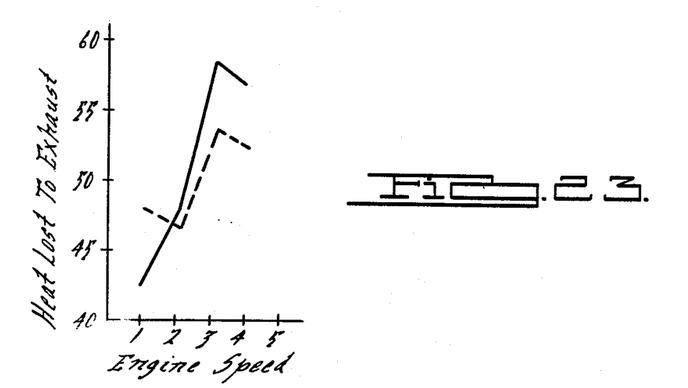

After casting of the head, a longitudinally extending passageway 8 is drilled through the head material and interconnected with the grooves 10 by way of upright passage (not shown). The head casting has an outlet opening 24 which when compared to the outlet opening 87 of the prior art head side of the head housing, illustrates the velocity difference necessary to render an equal volume displacement. The walls are of a predetermined thickness substantially surrounding the roof portion of each of the cylinders and are consistently thin throughout the remainder of the casting. For example, the thickness across 7 (FIG. 10) is about 0.25-0.3 inches and the thickness across 6 (FIG. 16) is no less than 0.28 inches, and typically about 0.3 inches.

Saddled between the V-shaped block and heads for said engine is a cast aluminum intake manifold 65 which employs intake passages emanating from a series of for apertures in the top wall thereof (not shown), two of which communicate with a first labyrinth of passages 88 leading to the series of four intake passages at one side and the other communite with a second labyrinth of passages 89 leading to the four intake passages on the other side. The intake manifold is of a crossflow construction whereby exhaust gases are sequestered and allowed to pass through passages 90-91 underneath the labyrinth of passages 88-89 in heat exchange relationship for facilitating vaporization of the combustible mixture on its delivery to the intake passages. The heat exchange surface 92 is provided with a series of extended heat absorbing surfaces in the form of ribs 93-94.

Mounted at outwardly facing sides of each of the heads 9a is an exhaust manifold 66 of the double-walled (96-97) insulated construction type, where exhaust gases are permitted to enter a recirculating or turbulizer chamber 95 and finally exhausted through a central aperture 98 at the far end and where the exhaust gases are then brought forward of the engine to be exited through an exhaust system which may include emission control elements.

An additional thermal control feature of the head 9 is the exhaust port shape. As previously stated, this port can be found during the casting process by a metal die piece. This is possible because of the elimination of the conventional water jacket passage or core as used in conventional head construction which allows a large size straight in exhaust port to be used. Because of the exhaust port size (or area) and straight in design, a thin metal exhaust port liner (100) can be slipped into the exhaust port during engine assembly. The inner surface of the slip-in liner shape conforms to that of an ideal exhaust port surface configuration and has excellent gas flow properties. The liner is insulated against heat transfer to the aluminum head by a gasket (101) at the head face and an air gap (102) between the liner and the aluminum exhaust port wall. The liner, because it is thin and well insulated from the aluminum head, heats up very fast and speeds up the oxidation reaction process of the exhaust gases for better emission control. Exhaust ports, which are surrounded by water, as in conventional cylinder heads, cannot be as large in area or as straight, thus making it difficult, if not impossible, to design a good flowing slip-in liner. Most of the prior art designs try to cast in the exhaust port liner; this is inferior because the liner and aluminum heat will be in contact at several points including the forward and rear ends; this results in a considerable increase in heat transfer over the insulated slip-in design. Excessive heat transfer results in increased heat rejection to the coolant, which requires a larger radiator, and also results in a lower exhaust gas temperature which reduces the gas oxidation process which in turn results in higher emission feed gas levels.

As a result of the unique cooling concept of this invention, an engine will not emit more hydrocarbons at somewhat less compression ratios; the octane rating of the required fuel does not need to be lowered to accommodate slightly lower compression ratios. Furthermore, the adjustment of the air/fuel ratio for the engine need not be resorted to in order to run the engine at a lower wall temperature level. The latter has been a typical remedial measure to reduce the severity of cooling problems, since the combustion temperature is lower if the air/fuel ratio is richer.

I claim:

1. An engine head having a body consisting of a cast metal having a thermal conductivity exceeding 0.28 calories-cm. per second-cm.$^2$-° C., said body having a flat plane bottom and having opposed sides, the body comprising:
   (a) first walls defining a series of cylindrical combustion chamber portions arranged side-by-side, each extending through the bottom of said head, each chamber being the site of an intense periodic heat source during engine operation,
   (b) second walls defining a plurality of exhaust gas passages, each extending between one chamber portion and one side of said head, said exhaust passages serving as a second site of an intense heat source during engine operation,
   (c) third walls defining a plurality of valve guide cylinders extending from the top of said head into each chamber, said third walls having a portion serving as a separation between said exhaust gas passages and said valve guide cylinders,
   (d) first means defining a pair of streamlined liquid cooling flow paths extending in parallel along the sides of each of said chamber portions through said first walls, and
   (e) second means defining a streamlined, liquid cooling flow path disposed in said portion of said third walls separating said valve guide cylinders and exhaust gas passages, said first and second means being effective to carry heat away from said heat source sites at a rate equal to or greater than the thermal conductivity of said light metal.

2. The engine head, as in claim 1, in which said second means comprises a straight cylindrical passages.

3. The engine head, as in claim 2, in which said cylindrical passage is drilled thereby possessing a smooth machined surface, the average area of said cylindrical passage being about 0.55 in.$^2$.

4. The engine head, as claim 1, in which the rate of flow of said cooling fluid through said first means is in the range of 120–130 inches per second and the rate of flow of said cooling fluid through said first means exceeds the rate of flow in said second means, the total average area through which said flow is conveyed in said first and second means is about 1–2 in.$^2$.

5. The engine head as in claim 1, in which said cast metal body forms a solid interconnection between first, second and third walls, said walls and interconnection having a transverse dimension in any direction exceeding 0.3 inches.

6. The engine head as in claim 5, in which the use of said first means results in the definition of an outer wall conforming in configuration to the flow path therethrough, said outer wall having a transverse thickness dimension in the range of 0.25–0.3 inches.

7. A method of cooling the head of an internal combustion engine, comprising:
   (a) forming the head as a cast body consisting of a metal having a thermal conductivity exceeding 0.28 cal-cm./sec.-cm.$^2$-° C., said body being provided with a flat bottom, opposed sides, first walls defining a series of cylindrical portions arranged side-by-side with each portion extending through said bottom, having second walls defining a plurality of gas passages with each extending between one cylindrical portion and one side of said head, and third walls defining a plurality of valve guide cylinders each extending from the top of said head into one cylindrical portion, said third walls having a portion serving as a separation between said exhaust gas passages and said valve guide cylinders,
   (b) convey cooling fluid through said first walls in at least one laminar non-turbulent first flow path extending from one end of the head along the sides of each of said cylindrical portions to the opposite end of the head, and convey cooling fluid through a cylindrical boring in said portion of said third walls in a laminar non-turbulent manner while in parallel flow with said first flow path, the flow rate and flow area of said flow paths being adjusted to carry heat away from said metal at a rate equal to or greater than the thermal conductivity of said metal whereby any nucleate boiling at the interface between said flow and metal is limited and controlled to increase the thermal heat transfer thereacross.

8. The method as in claim 7, in which a heat flux path from either said cylindrical portions or exhaust gas passages through the cooling flow will substantially traverse a greater dimensional in said metal while maintaining a more uniform average metal temperature.

9. The method as in claim 7, in which said metal is aluminum and said first flow path consists of parallel portions, each portion extending only about an independent side of said cylindrical portions, said second flow path being spaced from said first flow paths by at least 3 inches.

10. A method of cooling the housing of an internal combustion engine, comprising:

(a) providing a housing with first and second walls together defining a series of cylinders for carrying out combustion, said second walls surrounding that portion of the cylinders within which ignition of a combustible mixture takes place and said first walls providing for expansion of said combusted mixture, said second walls being comprised of a material having a higher thermal conductivity than said first walls, (b) conveying cooling fluid through at least one continuous passage extending first through said first walls, and thence through said second walls, said passage having a smaller flow area in said second walls than in said first walls to establish a higher velocity fluid flow through said second walls than when through said first walls.

11. The method as in claim 10, in which the difference in thermal conductivity between said first and second walls is at least a factor of 1.5.

12. The method as in claim 10, in which the flow velocity of said fluid flow in said second walls is higher than the flow velocity in said first walls by a ratio of 5:1.

13. The method as in claim 10, in which the flow velocity through said second walls is in the range of 120-130 inches per second and the flow velocity through said first walls is about 20 inches per second, the average flow area through said second walls being about 1.70 in.$^2$, the average flow area through said first walls being about 8.5 in.$^2$, and the viscosity of said fluid being in the range of 0.81 centipose at 190° F.

14. The method as in claim 11, in which said cooling fluid passage is configured to be a narrow but deep body of fluid wrapped hemi-cylindrically and consecutively about each of said cylinders, the depth of said wrapped body of fluid being aligned with the general axis of each of said cylinders.

15. The method as in claim 10, in which said at least one continuous passage is comprised at least in part of two parallel passages each extending consecutively along each of said cylinders in said first walls before extending in series and consecutively along each of said cylinders in said second walls.

16. The method as in claim 10, in which said cooling fluid is conveyed through said first walls by way of a first plurality of flow passages arranged in a parallel circuit connection and supplied by a common source of fluid, said cooling fluid is thence conveyed in a series from said first plurality of flow passages to a second plurality of flow passages also arranged in parallel fluid connection with respect to each other in said second walls, the flow velocity in said second plurality of flow passages being greater than in said first plurality of flow passages.

17. The method as in claim 16, in which at least two of said first parallel passages extend consecutively along each of said cylinders in said first walls before the fluid is allowed to be conveyed to said second plurality of passages, and at least two of said second plurality of passages extend consecutively along each of said cylinders in said second walls.

18. The method as in claim 17, in which said fluid is conveyed by said at least two passages of said first plurality of passages and by said at least two passages of said second plurality of passages as narrow deep strips of fluid wrapped hemi-cylindrically and consecutively about each of said cylinders in the respective walls, at least two passages of said first plurality of passages being connected with said at least two passages of said second plurality of passages by way of at least one slot defined in a barrier separating said first and second walls and located at an end of said housing remote from the end at which fluid enters the housing.

19. An engine head for an internal combustion engine, comprising:

(a) an elongate housing comprised entirely of aluminum and having walls defining a top closure for a galley of aligned cylinders opening onto the bottom face of said housing, said housing having walls defining passages for inducting a combustible mixture and exhausting combusted gases, said closure walls extending upwardly from the bottom face of said housing, (b) means defining a series of interconnected hemi-cylindrical grooves in said housing extending upwardly from the bottom face of said housing and consecutively along each of said cylinders, said grooves limiting the lower portion of said top closure walls to a thin-sectioned cylinder, said grooves being so interconnected as to leave a solid siamese connection between each of said thin-sectioned cylinders.

20. The engine head as in claim 19, in which said hemi-cylindrical grooves cooperate in forming two independent flow paths on opposite sides of a centerline extending between each of said cylinders, each of said flow paths extending transversely and consecutively from one cylinder to the next.

21. The engine head as in claim 20, in which each of said flow paths are arranged at opposite sides of said housing when viewed in cross-section, said housing also having a third flow path arranged as a cylindrical boring located at the upper side of said housing spaced generally midway between said grooves, each of said three flow paths are commonly supplied with fluid from one end of said housing.

22. The engine head as in claim 19, in which said grooves are closed on all sides except for their intersection with the bottom face of said housing.

23. An engine head as in claim 19, which further comprises gasket means supported at the bottom face of said housing and adapted to close said grooves for defining a closed fluid passage except for a slot in said gasket providing an ingate for a supply of said fluid to said head, the pressure head across said groove inducing a relatively high velocity flow through said fluid passage.

24. The engine head as in claim 19, in which said housing is defined as an aluminum casting with the parting surface of said casting defining said bottom face, said grooves being formed by coring supported through said parting surface.

25. An engine head as in claim 19, in which said passages for exhausting combusted gases contain a liner to isolate heat therein, said liner being supported independently of said head and spaced therefrom when assembled in an engine.

26. An engine head as in claim 19, in which the wall section separating said grooves in the interior of said cylinder has a dimension no less than 0.28 inches.

27. The engine head as claim 19, in which the walls for said cooling passages are defined so as to insure a substantially laminar or controlled turbulence flow throughout.

28. An engine head as in claim 19, in which said cooling passages are defined as continuous bands of fluid arranged in a chained series of hemi-cylinders, the interconnection between said hemi-cylinders having additional fluid passages directed transversely therethrough to shed any vortices occurring at such interconnections.

29. An engine housing for an internal combustion engine, comprising:
   (a) a first housing part having an upper face and being comprised of a material having a first level of thermal conductivity, said first part having walls defining the lower portions of a series of cylindrical spaces arranged in a row with axes of said cylindrical spaces being generally parallel and upright, said cylindrical spaces extending into the upper face of said first part,
   (b) a second housing part having a bottom face and being of a material having a much higher thermal conductivity than said first part and arranged to be clamped onto said first part, said second part having walls defining the upper portions of a series of cylindrical spaces aligned with and in communication with the lower cylindrical portions defined in said first housing part,
   (c) means defining at least one continuous groove in said first part and opening through said upper face of said groove having a depth extending more than half the depth of each of said cylindrical spaces, said continuous groove being formed with a series of hemi-cylinders interconnected so that the groove may extend from one end of said row of cylindrical spaces and proceed in consecutive series along the sides of said row of cylindrical spaces, said continuous groove defining a space within which cooling fluid may be caused to flow in a path extending as a strip-like body of fluid along the sides of said cylinder,
   (d) means defining at least one second continuous groove opening through the bottom face thereof which is adapted to vertically align with the continuous groove in the first part and having a height substantially the same as the height of said upper portions, said second groove extending from the other end of said two cylindrical portions to terminate adjacent said one end,
   (e) means separating said first and second parts and adapted to act as a sealing gasket therebetween, said separating means having at least one arcuate slot defined at said other end for providing a fluid communication between the first and second grooves.

30. The engine housing as in claim 29, in which said walls defining said groove and cylinders in said first part and the walls defining said grooves and cavities in said second part result in the definition of a thin wall barrel about each of said cylindrical spaces, said thin wall having a transverse dimension about 0.15 inches and outer walls having a transverse dimension about 0.12 inches, said thin wall being placed under a compressive force to thereby resist loading as a cylindrical column and to suppress noise transmission.

31. The engine housing as in claim 29, in which said first part is comprised substantially of an aluminum alloy and said second part is comprised of cast iron.

32. The engine housing as in claim 29, in which small perforations are defined in said separating means to communicate the inner most undulations of said grooves when viewed in a plan view, said perforations serving as a short circuit of fluid from the lower portion to the upper portion to eliminate flow vortices occurring at said inner most undulations.

33. A housing for an internal combustion engine having a series of aligned cylindrical spaces, comprising:
   (a) upper and lower housing parts having flat mating surfaces clamped together by bolts extending from the remote surfaces of the assembly and each effective to define part of each cylindrical space, the upper housing part being constituted of an aluminum alloy and the lower housing part being constituted of cast-iron,
   (b) means defining a pair of continuous grooves in each of said parts extending from one end of each part to the other and extending consecutively along one side of each cylindrical space, said grooves being connected in circuit with a cooling system for providing flow therethrough, said grooves being open to said flat mating surfaces along their entire extent, and
   (c) barrier means separating the grooves in said parts and being sandwiched between said clamped parts, said barrier means having one or more openings at one end to communicate the grooves in one part with the grooves in the other part in series.

34. The housing as in claim 33 in which said grooves are juxtaposed substantially the entire sides of said cylindrical spaces except for the thickness of said barrier means.

35. The housing as in claim 34 in which the thickness of said barrier means is no greater than 0.30 inches.

* * * * *